United States Patent [19]

Pietsch

[11] 4,032,352

[45] June 28, 1977

[54] BINDER COMPOSITION

[75] Inventor: Wolfgang B. Pietsch, Charlotte, N.C.

[73] Assignee: Midrex Corporation, Charlotte, N.C.

[22] Filed: May 3, 1976

[21] Appl. No.: 682,418

[52] U.S. Cl. .................................... 106/78; 106/83
[51] Int. Cl.² ........................................... C09J 1/02
[58] Field of Search ............................... 106/78, 83

[56] References Cited

UNITED STATES PATENTS 2,475,781   7/1949   Gallup .................... 106/83

*Primary Examiner*—J. Poer
*Attorney, Agent, or Firm*—Ralph H. Dougherty

[57] ABSTRACT

A binder composition for agglomerating directly reduced metallized particles and mineral ore particles comprises pitch, hydrated lime, sodium silicate and water. An agglomerated product is also disclosed.

12 Claims, 1 Drawing Figure

U.S. Patent June 28, 1977 4,032,352
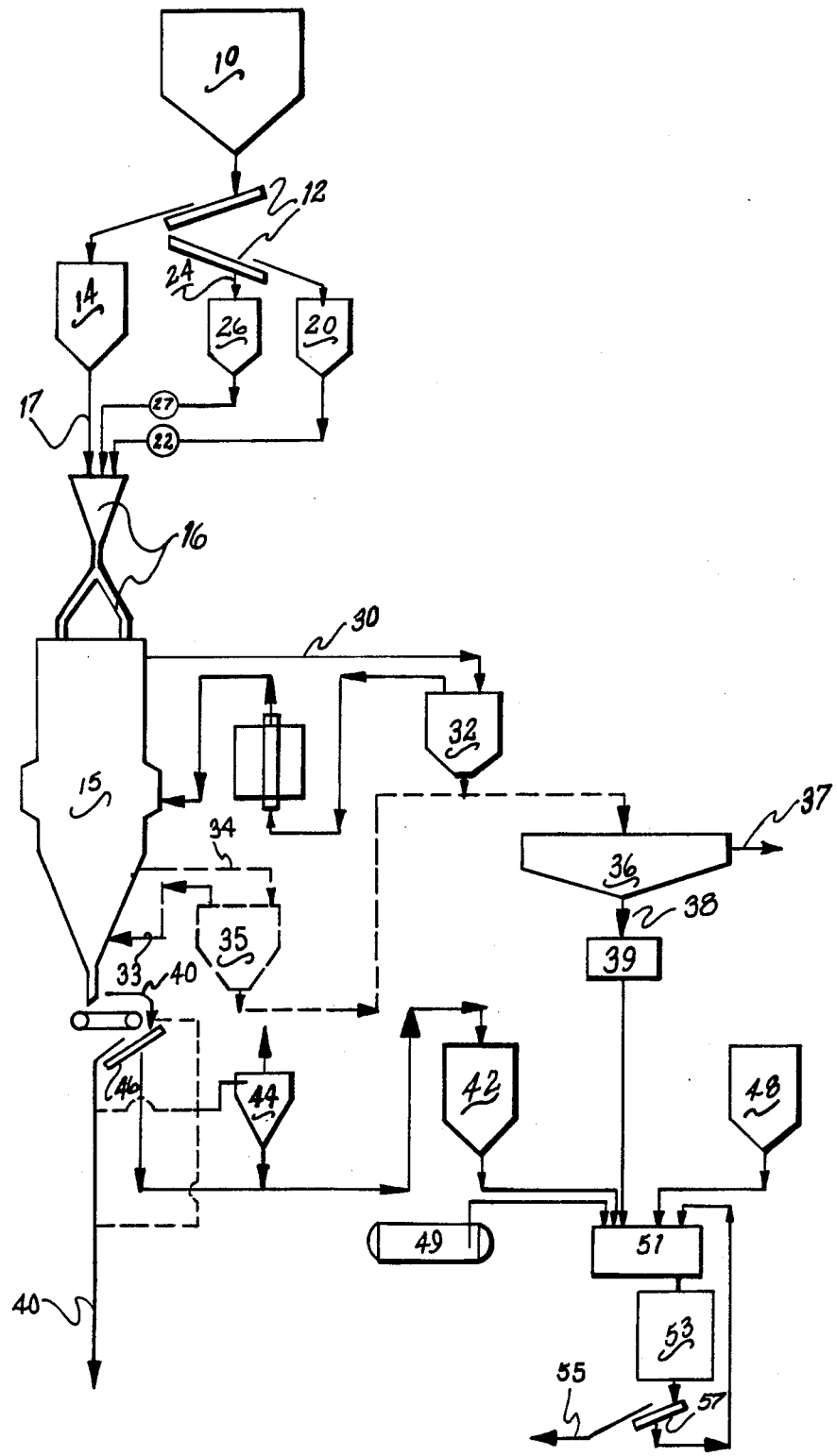

BINDER COMPOSITION

BACKGROUND OF THE INVENTION

This invention relates to the field of agglomeration of mineral ores and more particularly to agglomeration of directly reduced metallized particles. An extremely large number of binder compositions have been developed and patented over the years. However, no binder is known to be suitable for agglomerating highly metallized finely divided particulates such as iron fines from direct reduction process, a steel mill, a foundry or the like without oxidizing the metallic fines. More particularly, a significant percentage of finely divided iron particulates or fines are produced in the operation of a direct reduction furnace whereby iron ore or pellets are reduced to highly metallized particles such as pellets or lumps, by direct contact with a reducing gas such as a mixture of hydrogen and carbon monoxide. These fines are normally discarded or stockpiled and constitute a waste material inasmuch as there has been no suitable binder available for agglomerating these fines. Sintering or other treating method normally causes oxidation of the fines which thereupon required an additional reduction step. This is, of course, extremely inefficient inasmuch as the particulates are reduced twice.

Another method for utilizing fines that has been tried is to seal the fines into drums and charge the drums filled with fines into a steelmaking furnace. This is an extremely expensive method of recovering the fines because of high handling costs and drum expense. In addition, the finely divided particles constitute a health hazard for workers as well as a dust problem in the furnace.

Briquets have been found to be a very desirable charge material in iron or steelmaking. They are particularly suitable for foundries. The high specific gravity enables briquets to penetrate the slag layer on a molten metal bath in an induction furnace more readily than other, lighter charge materials. The large size of briquets prevents them from trickling through a furnace charge as is common with fine materials, particularly when employed as a charge material for cupolas. Briquets made in accordance with the teachings of the present invention have higher carbon levels than normal charge materials. This reduces the necessity for recarburization of the metal produced. The quality of the present binder allows the addition of coke breeze, ferro-alloys and other materials to the briquets, which can be stored and handled in the same manner as steel scrap. The high strength of the briquets, their waterproof bond, and the rust inhibiting properties of the binder allow outdoor storage and generally rough handling. The binder composition also makes it possible to tailor-make briquets for particular applications.

OBJECTS OF THE INVENTION

It is the principal object of this invention to provide a relatively inexpensive binder composition for agglomerating fine particulate metallic ores without loss of metallization.

It is another object of this invention to provide a binder composition which imparts high green strength to briquets.

It is also an object of this invention to provide a binder composition which increases the high strength of briquets upon curing.

It is another object of this invention to provide a binder compsition which results in briquets which are themselves strong, easily handled with standard loading and unloading equipment and produce a minimum of dust during handling.

It is another object of this invention to provide a binder composition which is required in minimum amounts for the production of briquets.

It is another object of this invention to provide a binder composition, the components of which are readily available in many countries throughout the world.

It is also an object of this invention to provide a binder composition which will protect a briquet from signficiant loss of metallization by inhibiting reoxidation of rusting.

It is another object of this invention to provide a binder composition which has a waterproof bond.

It is also an object of thsi invention to provide a binder composition, the use of which provides lubrication to reduce wear of briquetting equipment.

It is another object of this invention to provide a binder composition having ingredients useful in the manufacture of iron and or steel.

It is also an object of this invention to provide a binder composition for producing high quality briquets over a wide range of component variations.

It is also an object of this invention to provide a binder composition highly insensitive to amount of moisture in the feed material.

It is another object of the invention to provide a binder composition for agglomerating particulates, the particle size of which is not absolutely critical.

It is another object to provide a method for the total recovery of fines from a direct reduction plant whereby wet fines, dry fines, and undersized product from a direct reduction furnace are all briquetted or otherwise agglomerated using a common binder.

This invention may be better understood by referring to the following detailed specification and the appended drawing in which:

The single FIGURE is a schematic diagram showing the flow of materials in the invented method.

DETAILED DESCRIPTION

The binder of the present invention consists essentially of liquid sodium silicate, hydrated lime, powdered pitch and water. This binder has exceptional characteristics including high green strength, waterproof bond, and rust inhibiting capability.

The binder material is mixed with finely divided metallized material such as directly reduced sponge iron fines to form a free flowing feed material. The feed material is mixed and predensified by apparatus such as a mix muller, then formed into briquets or other dense compact product by known formation means. Suitable briquetting machines are taught by U.S. Pat. No. 3,897,183 and numerous other patents.

The broad range of the binder composition is from 2 to about 40 percent pitch, from 15 to about 35 percent hydrated lime, from about 15 to about 20 percent liquid sodium silicate and up to 50 percent water. The preferred range is 15 to 20 percent hydrated lime, 15 to 20 percent powdered pitch, 30 to 35 percent liquid sodium silicate and 30 to 35 percent water. A very economical binder which results in acceptable briquet strength contains only 3 to 5 percent powdered pitch, 30 to 35 percent hydrated lime, 15 to 20 percent sodium silicate and up to 50 percent water. More of the latter binder must be added to the feed material to achieve acceptable briquet strength than the preferred binder composition.

The liquid sodium silicate is in aqueous solution, having a concentration of 30 to 55 percent by weight, depending on the type of sodium silicate. Sodium silicate is a generic term for a family of chemicals composed of sodium oxide ($Na_2O$), silica ($SiO_2$) and usually water ($H_2O$). The proportion of $Na_2O$ to $SiO_2$ in sodium silicates is expressed as a weight ratio with the alkali component held at unity. Commercial grades of liquid sodium silicate are usually concentrated for convenient handling. For instance, sodium silicate having a weight ratios of 3.22 can readily be handled up to a solids content of about 39.8 percent which is equivalent to approximately 43° Baume.

A liquid sodium silicate solution as employed in the invention has a weight ratio of 3.22, a solids content of 37.6 percent, a density of 41.0 degrees Baume, and a viscosity of 180 centipoises. Liquid sodium silicate as used throughout this specification refers to this 37.6 percent solids sodium silicate solution unless otherwise specified.

Other sodium silicates can be utilized but it is preferable to maintain the $Na_2O$ at the lowest possible ratio to $SiO_2$. Thus the 3.22 mixture, which is also the most readily available commercially, is the preferred ratio.

The sodium silicate solution brings to the binder composition the property of rendering the subsequent agglomerates or briquets rust resistant.

Pitch having a ring and ball softening point in the range from about 90° C to about 210° C, but preferably in the range from about 120° C to about 175° C is employed in the mixture. The pitch is in powdered form, preferably having a particle size all minus 100 mesh. Powdered pitch lubricates the faces of the briquetting machine, reducing die wear, and internally lubricates the mixture thus reducing interparticle friction and resulting in better densification. In addition, it creates a waterproof bond between the metallized particles in the briquet. The addition of powdered pitch also causes an increase in the carbon content of the briquet as well as a slight increase in sulfur content, generally less than 0.01 precent.

The hydrated lime of the binder composition is preferably in powdered form, and most preferably all minus 100 mesh. The hydrated lime produces plasticity of the mixture to be briquetted and improves briquet strength.

Moist mill scale can be used in place of hydrated lime without significantly changing the physical characteristics of the briquets. Green strength of the briquet is lower than with the preferred binder composition, but the strength increases to a comparable figure after air curing. Naturally, the degree of metallization is less, and uncontrollable impurities are added to the briquet along with the mill scale.

When the preferred binder is used with metallized fines, wet clarifier underflow or sludge can be incorporated into the briquet mix without changing the physical characteristics of the briquets as air cured. Of course, metallization of the briquet is reduced when sludge is incorporated into it. It has been found that up to 25 percent sludge can be added to the briquet mix without deleterious effects. Of course, the amount of water in the binder must be reduced by the water content of the sludge.

The dry component so of the invented binder composition may be pre-mixed or blended or the components may be individually metered into briquet feed material together with the liquid binder component when the feed material will be mixing before briquetting.

The following are specific examples of suitable binder compositions.

A binder composition was formulated containing 46% liquid sodium silicate, 27% hydrated lime and 27% powdered pitch. Seven percent of this binder was blended with 93% metallized fines prior to briquetting the blended mixture.

Another binder composition included 32% liquid sodium silicate, 18% hydrated lime, 18% powdered pitch and 32% water. A briquet feed stock was made from a blend of 11% of this binder composition and 89% metallized fines.

A composition which utilized a much larger percentage of lime was formulated from 16% liquid sodium silicate, 32% hydrated lime, 4% powdered pitch and 48% water. Thirteen percent of this binder was blended with 87% metallized fines to formula briquet feed stock.

Briquets made with binders according to the invention have been extensively tested with outstanding results:

1. Green strength was 95% plus one-half inch when dropping a two kilogram sample 12 feet onto a steel plate.
2. Air curing of several hours (6 – 25 hours) improves the strength slightly to 96% plus one-half inch when a two kilogram sample is dropped 12 feet onto a steel plate.
3. The bond is waterproof. Three days soaking in water does not affect the strength of the briquet.
4. Briquets utilizing the invented binder are passivated against tap water. Briquets wetted with water and placed into an insulated, vented 55 gallon drum for four days showed no heating during and no rusting at the end of the test.
5. Briquets soaked in tap water for three days did not rust during succeding air drying.

Briquets made with the invented binder composition were treated in four different ways then tested for thermal-shock resistance. Some briquets were dried for 1 hour at about 200° C, some were air dried, some were soaked in water for 5 minutes, and some were soaked in water for 5 days. When briquets were placed in a muffle furnace which had been heated to an equilibrium temperature of approximately 1095° C, heated red hot, removed from the furnace, placed on a wire mesh screen, and air cooled, none of the briquets disintegrated or spalled.

A further advantage of invented binder composition is its employment as a binder in a briquetting system used in conjunction with a direct reduction furnace and a fines metering system to achieve total recovery of fines in a direct reduction plant. This system is depicted in the drawing.

Raw materials 10 are introduced to a screening apparatus 12 by which fines are removed from the feed stock. Preferably, a double-deck screen is employed which creates two sizes of fines as well as sized feed material. A first screen has 5 to 6 millimeter openings and a second screen has 2.5 to 3 millimeter openings. Sized pellet or lump material passes from the day bin 14 to direct reduction furnace 15 through feed system 16 by conveyor 17. Intermediate sized fines are transported to a stock pile or surge bin 20 from whence they are metered through metering device 22 into the furnace feed system 16. The finest particulate material is transported by conveyor 24 to a second surge bin or stock pile 26, then fed to furnace 15 through a second metering device 27 and the furnace feed system 16. Both metering devices 22 and 27 are correlated with feed conveyor 17 to maintain a constant proportion of sized feed and each size of fines into the furnace as feed material. The furnaces feed system 16 is designed to render furnace 15 highly tolerant to fines in the feed.

Direct reduction furnace 15 is operated by passing a reducing gas through the downwardly moving burden in counterflow relationship thereto and removing the top gas or spent reducing gas along with a quantity of dust. This gas passes through conduit 30 to a wet dust collection apparatus such as a venturi scrubber 32. Cooling gas from pipe 33 may be passed countercurrently to the burden flow through the lower part of the cooling zone of the furnace 15. In this case, hot, dust-laden cooling gas is removed from the furnace through conduit 34 to a wet dust collection apparatus 35 which is similar to dust collector 32. Dirty water from dust collectors 32 and 35 is cleaned in a clarifier 36 from which cleaned water 37 is discharged or recirculated. The sludge 38 is removed from the clarifier, dewatered in a suitable device 39 and transported to an agglomerating plant such as briquetting plant.

Dry metallized fines and dust are removed from the directly reduced material upon exit of the product 40 and trasported to bin 42. Dry dust from each product transfer point is collected in a cyclone 44 and fines are removed from a product screening apparatus 46.

Metallized fines and dust from bin 42 and binders in solid and liquid form are fed from bin 48 and tank 49 respectively to the mixer 51 to form a briquet feed mixture. This feed mixture passes through a briquetting machine 53 wherein it is formed into briquet product 55. Fines separated in briquet screening apparatus 57 are recirculated to mixer 51 and consumed within the briquetting system.

The binders have the compositions as set forth in this specification. The screening and metering steps are required to maintain constant and known distribution of fines as a portion of the furnace burden. All fines not introduced to the furnace are converted into a briquet product utilizing the invented binder composition. Note that the incorporation of the clarifier underflow into the briquet feed material results in lowering the percent metallization of the briquet product. Such briquets can be recycled through the direct reduction furnace to increase the percentage of metallization or can be utilized as feed material for iron or steelmaking furnaces.

From the foregoing, it is readily apparent that the invented binder composition is inexpensive and produces a briquet which has high green strength, high cured strength, waterproof bond, high overall quality, and is insensitivve to both moisture and thermal shock.

What is claimed is:
1. A binder composition for mineral ores and metallized particulate material consisting essentially of
    from about 2 to about 40 percent pitch,
    from about 15 to about 35 percent of the group consisting of hydrated lime, moist mill scale, and mixtures thereof,
    from about 15 to about 30 percent liquid sodium silicate; and up to 50 percent water
2. A binder composition according to claim 1 consisting essentially of
    from about 2 to about 40 percent pitch,
    from about 15 to about 35 percent hydrated lime,
    from about 15 to about 30 percent liquid sodium silicate, and up to 50 percent water.
3. A binder composition according to claim 1 wherein said hydrated lime is in powdered form.
4. A binder composition according to claim 3 wherein the particle size of said hydrated lime is all minus 100 mesh.
5. A binder composition according to claim 1 wherein said pitch has a ring and ball softening point in the range from about 90° C to about 210° C.
6. A binder composition according to claim 5 wherein said pitch has a ring and ball softening point between about 120° C and about 175° C.
7. A binder composition according to claim 5 wherein said pitch is in powdered form.
8. A binder composition according to claim 7 wherein the particle size of said pitch is all minus 100 mesh.
9. A binder composition according to claim 1 wherein said liquid sodium silicate is an aqueous solution.
10. A binder composition according to claim 9 wherein said solution contains about 30 to about 55 percent by weight sodium silicate.
11. A binder composition according to claim 1 consisting essentially of
    from about 15 to about 20 percent powdered pitch,
    from about 15 to about 20 percent hydrated lime,
    from about 30 to about 35 percent liquid sodium silicate, and the remainder water.
12. A binder composition according to claim 1 consisting essentailly of
    from about 3 to about 5 percent powdered pitch,
    from about 30 to about 35 percent hydrated lime,
    from about 15 to about 20 percent liquid sodium silicate, and up to 50 percent water.

* * * * *